United States Patent [19]

McCormick

[11] 4,162,218
[45] Jul. 24, 1979

[54] WATER REUSE SYSTEM

[76] Inventor: Gerald L. McCormick, Rte. 7, Allegan, Mich. 49010

[21] Appl. No.: 810,039

[22] Filed: Jun. 27, 1977

[51] Int. Cl.² .......................... C02B 3/08; C02C 1/40
[52] U.S. Cl. .......................................... 210/104; 4/1; 4/2; 210/167; 137/386; 210/258; 210/259
[58] Field of Search ............... 210/259, 257, 104, 258, 210/111, 167, 113, 152; 4/1, 2, 8, 114, 115, 209 FF, 10

[56] References Cited

U.S. PATENT DOCUMENTS

| | | | |
|---|---|---|---|
| 3,112,497 | 12/1963 | Call | 4/2 X |
| 3,318,449 | 5/1967 | Jennings et al. | 4/1 X |
| 3,915,857 | 10/1975 | Olson | 210/104 X |

Primary Examiner—Frank A. Spear, Jr.
Attorney, Agent, or Firm—Blanchard, Flynn, Thiel, Boutell & Tanis

[57] ABSTRACT

A used water reuse system includes a gray water holding tank to which gray water is supplied up to a maximum level through a filter and gray water drain line. Gray water sources such as kitchen and bathroom sinks, clothes and dishwashers, tubs and showers, and the like have drains connected through valves to the gray water drain line and to a conventional sewer line. Gray water is transferred, upon demand, from the gray water holding tank to noncritical water use devices, such as a toilet tank, for reuse and subsequent discarding. A sensor detects achievement of a maximum level in the gray water holding tank and causes the valves at the gray water sources to disconnect the latter from the gray water drain line, so as to discard any further gray water from the sources to the sewer line, and also closes a fail-safe valve to preclude flow from the gray water line to the gray water holding tank. Upon reduction of tank water level the sensor reopens the valves. A further sensor notes draining of the tank to a preselected minimum level for admitting fresh water thereto. Means interposed between the sensors, on the one hand, and the gray water valves and valving for the fresh water, on the other hand, respond to a power failure in a fail-safe manner to close such valves.

12 Claims, 2 Drawing Figures

WATER REUSE SYSTEM

FIELD OF THE INVENTION

This invention relates to a used water reuse system and more particularly relates to a gray water reuse system incorporating a gray water storage tank to which gray water flow is controllable.

BACKGROUND OF THE INVENTION

Water shortages have long been known in a number of areas in this country, and for that matter the world. Often, under water shortage conditions, water users have been requested or required to reduce water consumption. In a typical family household, daily water usage may be substantial, the typical household including a variety of water consuming devices, such as sinks, tubs, showers, dish and clothes washers, toilets and utility water outlets for lawn watering and so forth. Most families find it difficult to substantially reduce water consumption except on pain of inconvenience and consistent attention on the part of all family members to avoid unnecessary running of fresh water.

It has been recognized that in the typical household, water is used only once before discarding (draining to the sewer or septic tank for example) and that consumption of fresh water can be reduced by reuse of at least a portion of the incoming supply of water to the household before discarding. For example, U.S. Pat. Nos. 3,318,449 (Jennings) and 3,112,497 (Call) suggest systems in which household water consuming devices are essentially separated into two classes. The first involves devices such as kitchen and bathroom sinks, clothes and dishwashers, tubs and showers, and the like which are to be supplied with fresh water at most only lightly contaminated, as by soaps, detergents and so forth, and which for convenience reference is hereafter termed "gray water". The other class of device, on the other hand, normally includes toilets, for which the water input need not be fresh and which for health reasons are to drain directly to a septic tank, sewer line or the like. This second class of device may also include outlets for lawn sprinkling or other uses which can be performed as efficiently by gray water as fresh. In these systems, gray water drained from sinks, washers, etc. is kept in a tank and supplied on demand to toilets for flushing purposes. Reid U.S. Pat. No. 3,594,825 discloses basically a variation on the Jennings patent and is not believed to require separate discussion.

While these systems provide for a reduction in water wastage, by at least partial use of gray water, the present invention is intended to improve thereover by eliminating certain difficulties and unsatisfactory characteristics present in such systems.

In both Jennings and Call, gray water, as long as supplied from a gray water source (e.g. sink) will continue to flow into the gray water holding tank independent of tank water level, and thus even if the tank is full. Excess gray water entering the tank necessarily overflows, and thus requires an overflow drain pipe connected from the interior of the gray water holding tank to the sewer line, such that excess water supplied to the tank normally overflows from the holding tank to the sewer line. To minimize a build-up of solids in the holding tank, it is known such systems to provide a filter in the gray water drain line leading to the holding tank.

Disadvantages of such systems, overcome by the present invention, include risk of overflow of the holding tank (which may go unnoticed for sometime due to typical location of the tank in the basement in an out-of-the-way place) upon clogging of the tank overflow drain line, or more seriously, due to plugging of the sewer line downstream of the tank overflow drain line. In the latter instance, even should the holding tank not overflow, there is risk of contamination with sewer water of the holding tank, the gray water drain line feeding same and all devices provided gray water from such holding tank (e.g. toilet flush tanks, lawn watering hydrants, etc.).

Such known systems, due to the continuous connection of the gray water storage tank to the sewer line through the overflow conduit, appear to risk, in addition, backflow of sewer gas into the home from the tank. On the other hand, an attempt to seal the tank to avoid this problem risks contamination of a fresh water make-up line leading to the tank in the event of blockage of the tank overflow drain line, or downstream portions of the sewer line. Further, for proper operation of the tank overflow drain line in conducting excess gray water to the sewer line, the latter should be below the bottom of the holding tank and care must be taken to avoid siphoning of water from the sewer line into the gray water holding tank when gray water is removed from the holding tank, as to fill a toilet flush tank.

Accordingly, the objects of this invention include provision of:

A used water reuse system including means responsive to the water level in the gray water holding tank for determining whether gray water sources will then drain to the holding tank or instead to the sewer line, such that maximum tank level is controlled without recourse to an overflow drain.

A system as aforesaid in which valves, controlled by tank water level, determine flow from gray water source drains as between the tank and the sewer line and wherein a fail-safe valve operates to prevent excess filling of the tank in the event of failure of one of such valves.

A system as aforesaid in which said drain valves and fail-safe valve are pressure fluid operated and in which operating pressure fluid is obtained from a pressurized gray water line supplied by a pump on the output side of the gray water holding tank and leading to points of gray water use such as a toilet flush tank.

A system as aforesaid in which gray water pump action is initiated by sensing a reduction in pressure in the output line thereof as would normally result from demand by a gray water using device.

A system as aforesaid in which fresh water can be supplied to the gray water holding tank, for make-up purposes, in response to sensing of a holding tank level falling so low as to approach the tank outlet to the pump.

Further objects and purposes of the invention will be apparent to persons acquainted with systems of this type upon reading the following specification and inspecting the accompanying drawings.

SUMMARY OF THE INVENTION

Figure 1:
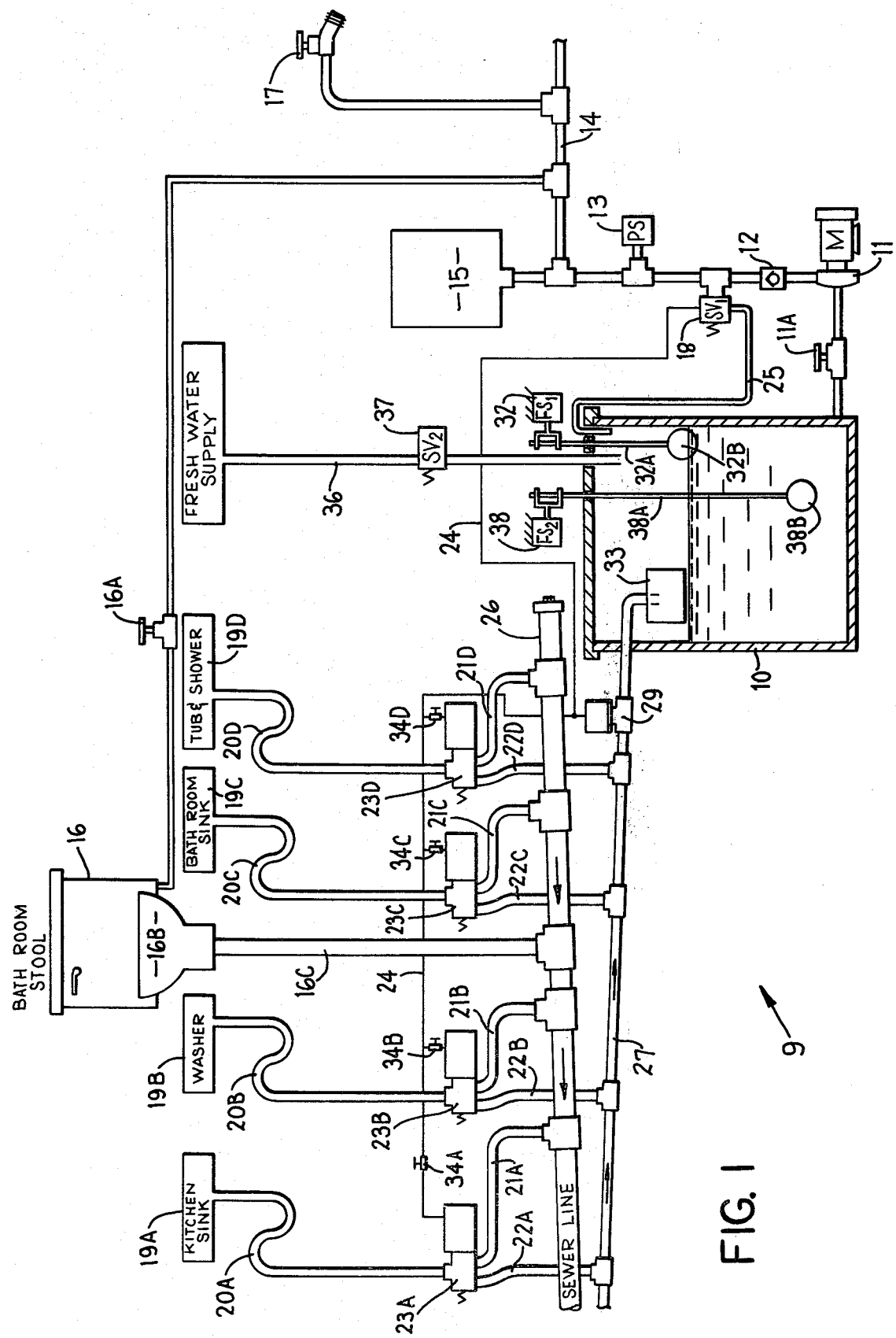
FIG. 1 is a substantially diagramatic disclosure of a water reuse system embodying the present invention.

The objects and purposes of the invention are met by providing a used water reuse system including a gray water holding tank to which gray water is supplied up to a maximum level through a filter and gray water drain line. Gray water sources such as kitchen and bathroom sinks, clothes and dishwashers, tubs and showers, and the like have drains connected through valves to the the gray water drain line and to a conventional sewer line. Gray water is transferred, upon demand, from the gray water holding tank to noncritical water use devices, such as a toilet tank, for reuse and subsequent discarding. A sensor detects achievement of a maximum level in the gray water holding tank and causes the valves at the gray water sources to disconnect the latter from the gray water drain line, so as to discard any further gray water from the sources to the sewer line, and also closes a fail-safe valve to preclude flow from the gray water line to the gray water holding tank. Upon reduction of tank water level the sensor reopens the valves. A further sensor notes draining of the tank to a preselected minimum level for admitting fresh water thereto. Means interposed between the sensors, on the one hand, and the gray water valves and valving for the fresh water, on the other hand, respond to a power failure in a fail-safe manner to close such valves.

DETAILED DESCRIPTION

The system 9 (FIG. 1) embodying the invention includes a holding tank 10 for water drained from points of use. The term "gray" water is here employed broadly to indicate water that has been used for some purpose but still has no or sufficiently little contamination as to be fit for reuse in some application which would otherwise expend fresh water. Typical household sources of such used, or gray, water are sinks, washing machines, showers, etc., but not toilets. Other sources may include, for example, air conditioners wherein well water merely absorbs heat in passing through an open loop heat exchanger. The gray water holding tank 10 is preferably covered, though not sealed, and in the preferred embodiment shown remains at atmospheric pressure. The tank 10 is sized as convenient and for an average family home, a tank in the range of 55 to 150 gallons may suffice.

A motor driven pump 11 (preferably electric motor driven) connects at its inlet to the lower portion of the gray water holding tank 10 preferably through a manually operable shut-off valve 11A. When the pump motor M is energized, the pump 11 applies gray water under pressure through a pressurized gray water line including a check valve 12 (oriented to preclude backflow to the pump 11), a solenoid valve 18, for purposes appearing hereafter, a pressure switch 13, actuable in response to a drop in pressure occasioned by demand for gray water, and a pressure tank 15 paralleled with a gray water output line 14. Connected to the gray water output line 14 are noncritical water use devices, such as toilet tanks, one of which is indicated at 16 and supplied through a conventional manual valve 16A, and/or a lawn irrigation outlet valve 17. The pressure tank 15 may be sized to permit drawing of small quantities of gray water from the line 14 without need for actuating pump 11, thereby permitting periodic actuation of the pump as a constant flow of gray water is taken from the line 14. The pressure switch 13 senses a reduction in normal pressure in the line 14 occasioned by drawing of water from gray water supply line 14 and is used, as hereafter described, to turn on the motor M of pump 11. Essentially then, a demand for gray water by gray water usage devices 16, 17, when it sufficiently drops the pressure line 14, will through the pressure switch 13 actuate the pump 11 to answer such demand for gray water. The pump 11 eventually restores pressure in the pressure tank 15 as when gray water is no longer being drawn through the pipe 14, and is shut off by pressure switch 13. While desirable, the pressure tank 15 can be eliminated, in which case the pump 11, responsive to pressure switch 13, operates when usage devices 16 and 17 are drawing gray water from line 14.

The system 9 embodying the invention, is intended to permit reuse of water from any of a variety of sources. By way of example, typical sources, such as a kitchen sink, clothes or dishwasher, bathroom sink, and tub and/or shower are shown diagramically at 19A-D. Fresh water may be supplied conventionally to the sinks, etc. 19A-D by any convenient means not shown. Used water draining from the sources 19A-D passes through corresponding traps 20A-D and may then pass through a conventional sewer supply line 21A-D, discharging to a conventional common sewer line 26, leading to a sewer, septic tank or the like, by which such water is discarded. Alternatively, however, the present invention provides for discharge of gray water from the sources 19A-D through respective valves 23A-D and associated lines 22A-D to a common gray water drain line 27. The valves 23A-D can be manually controlled but in the preferred embodiment shown are automatically remotely controllable as hereafter discussed, in response to the gray water level in tank 10. Thus, the valves are actuable to cause gray water flow from the corresponding source alternatively to the corresponding sewer connected line 21A-D or gray water tank line 22A-D.

Waste water from sources not considered suitable for use as gray water, such as the toilet stool 16B, is conventionally directed at 16C to the sewer line 26 and has no connection to the gray water line 27.

The gray water line 27 near its downstream end includes a fail-safe valve 29 which can be manually controllable, and in the preferred embodiment shown is automatically controllable in response to gray water tank level, along with valves 23A-D. From the fail-safe valve 29, the gray water drain line 27 extends into the upper end portion of the tank 10. The end portion of the gray water drain line 27 is preferably equipped with a filter or strainer, diagramatically indicated at 33, conveniently located in the tank 10. The filter 33 prevents unwanted passage to the pump 11 or gray water use devices 16, 17 of at least the courser solids suspended in the gray water supplied to the tank by line 27.

The gray water tank 10 is equipped with a water level responsive switch 32 which responds to increase in water level in the tank 10 up to a predetermined maximum. Preferably the level sensing switch 32 has a hysteresis characteristic such that the switch assumes its opposite state when the water level in the tank 10 has fallen at least somewhat below such maximum level. In the preferred embodiment shown, the switch 32 is a conventional float switch fixed as convenient on or adjacent the upper portion of the tank 10 and having an actuator 32A extending downward into the tank 10 and connected to a float 32B for rising and falling with the water level in the tank 10.

As is hereafter discussed, the gray water tank float switch 32 controls gray water valves 23A-D and failsafe valve 29 so that such valves block feeding of further gray water to the tank when the latter is in a filled, or maximum level, condition as monitored by the float switch 32. While use of electrically operated solenoid valves at 23A-D and 29, and direct control thereof by float switch 32, is contemplated, it has been found that system cost can be reduced by employing fluid operated valves at 23A-D and 29, and operating same indirectly from float switch 32 through a single electrically controlled solenoid valve 18. In this instance, valves 23A-D and 29 are air pressure activated, spring returned valves of conventional type connected in parallel to an air pressure supply conduit 24 in turn connected to the output side of solenoid valve 18. Solenoid valve 18 is here a spring returned, electrically actuated solenoid valve which in one state connects the air line 24 to the pressurized water line 14 interconnecting the pump 11 and pressure tank 15, so as to use this pressurized water line as the pressure source for the air line 24. Thus it will be seen that the fluid line or conduit 24 is herein employed as a hybrid fluid line with its valve controlling portion normally being occupied by air pressurized by water from the pressurized gray water line 14, some of which water may enter and occupy the rightward (upstream) end of the hybrid pressure fluid line 24. If desired, actual flow of water through line 24 to the valves 23A-D and 29 may be prevented by sloping of the line 24 downward toward the solenoid valve 18 or by employment of a suitable trap in such line. On the other hand, and less critically, the valves 23A-D and 29 may be of water actuable type. In its opposite state, the solenoid valve 18 disconnects line 24 from the pressurized gray water line 14 and instead exhausts line 24 through an exhaust conduit 25 draining to the gray water tank 10. If desired, pressure fluid flow to the valves 23A-D and/or 29 may be manually blocked by provision of normally open, manually closeable valves, for example as indicated at 34A-D and arranged such that closure of such manual valves 34A-D causes the corresponding pressure operated valves 23A-D and/or 29 to block gray water flow from the sources 19A-D to the tank 10, regardless of pressure conditions in line 24.

To prevent the water level in gray water tank 10 from dropping so low as to no longer supply the pump 11, and hence gray water usage devices 16, 17, the tank 10 is provided with a fresh water supply conduit 36 incorporating a solenoid valve 37 which is normally closed. Conduit 36 preferably extends somewhat into the tank 10 but terminates well above the maximum water level permitted in the tank 10, to avoid any possible contamination of the fresh water supply by the gray water end tank 10. The fresh water solenoid valve 37 is normally closed, as by a conventional spring arm, and is electrically operable when the water level in tank 10 falls to a point somewhat above the minimum required to supply gray water to the pump 11. In the preferred embodiment shown, the further float switch 38, preferably similar to float switch 32, is suitably fixed on or above the upper portion of tank 10, with its actuator 38A and float 38B extending downward into the tank with the switch actuating position of the float 38B being substantially at the height at which is shown in FIG 1.

Figure 2:
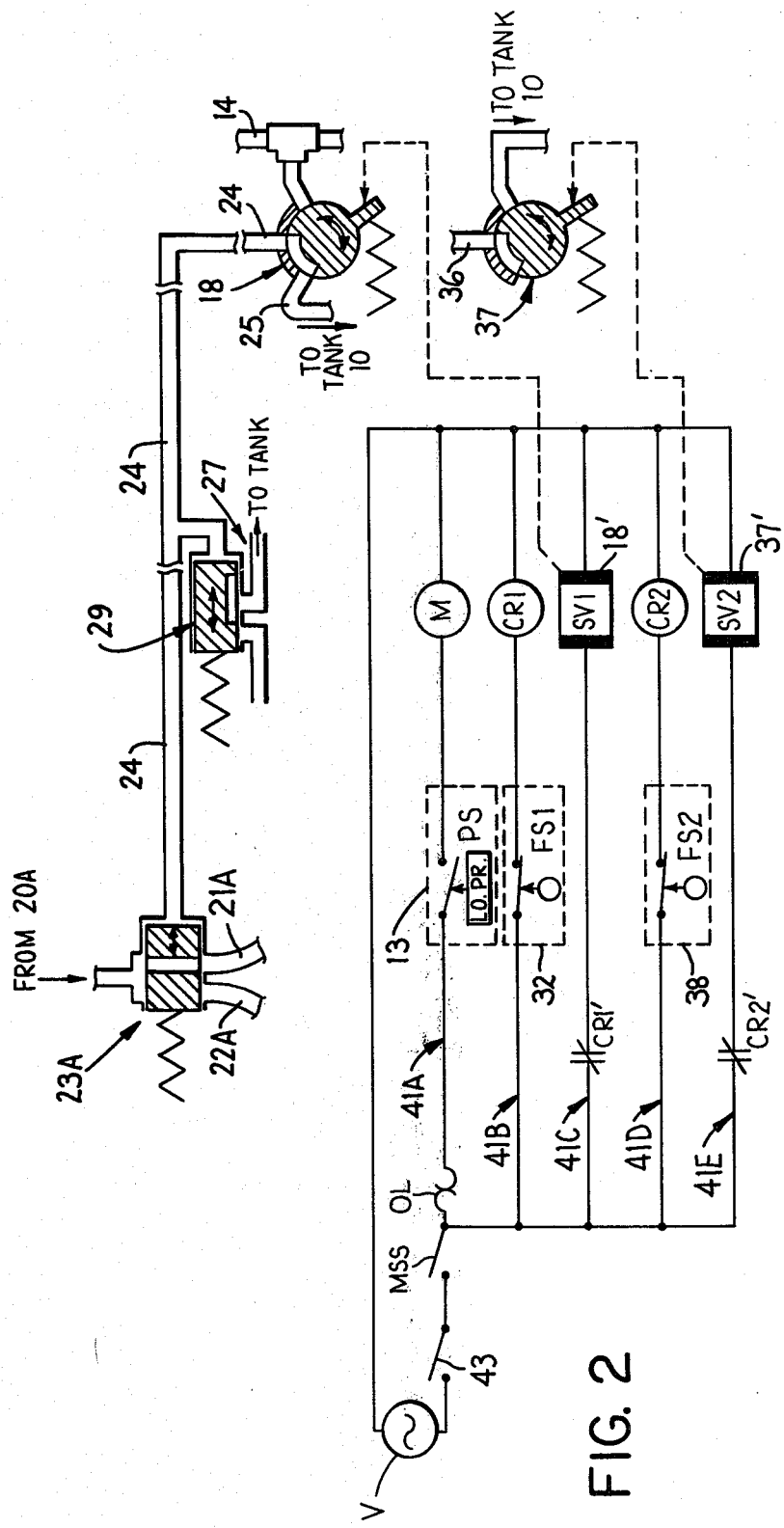
FIG. 2 is an electrical schematic for the system of FIG. 1.

FIG. 2 schematically discloses a control circuit for the system of FIG. 1.

Thus, FIG. 2 discloses a plurality of parallel electrical paths 41A-E connected across a suitable voltage source V, for example a conventional 110 volt AC source. Path 41A includes the pressure switch 13 and pump motor M in series. Preferably the pump motor includes an overload protection device here in the form of an excess current sensor OL normally incorporated in the motor M and shown connected in series with the windings of the motor M for convenience. Associated with the sensor OL is a motor sentinel switch MSS which opens in response to an overload condition and is here interposed between all of the electrical paths 41A-E and the voltage source V so as to shut down the entire system in response to a pump motor overload condition. Preferably a manual on-off switch 43 connects in series between the voltage source V and the remaining circuit for controlling energization of the latter.

Path 41B includes the gray water float switch 32, which is normally open when the water level in gray water tank 10 is below maximum range, and a relay coil CR1 in series therewith. Parallel electrical path 41C includes a normally closed contact CR1' of relay CR1 and in series with the solenoid portion 18' of the gray water solenoid valve 18. In the embodiment shown solenoid valve 18 has a spring urged rest position connecting pressure line 24 with exhaust line 25, as shown, in an energized position resulting from energization of solenoid 18' which applies pressure fluid from pressure line 14 to line 24.

Electrical path 41D comprises, in series, fresh water float switch 38, normally closed when there is sufficient water in the tank 10, and a relay coil CR2. Electrical path 41E includes a contact CR2' of aforementioned relay CR2, which contact is closed with relay CR2 deenergized, and in series therewith the solenoid portion 37' of fresh water solenoid valve 37. The fresh water solenoid valve 37 is normally spring biased to its closed condition shown, isolating the fresh water source feeding line 36 from the tank 10, in response to high water level closure of float switch 38, energization of relay CR2 and consequent opening of contacts CR2' thereof. On the other hand, should the water level in the tank 10 fall sufficiently, as to endanger the water supply to the inlet of pump 11, fresh water float switch 38 will open, deenergizing relay CR2 and permitting contact CR2' thereof to close, thereby energizing solenoid 37' and switching valve 37 from its position shown to its open position, permitting flow from the fresh water source through line 36 to the tank 10.

In the embodiment shown, the valves 23A-D and 29 may be substantially of the type schematically shown in FIG. 2. Thus, with fluid pressure applied from line 14 through the valve 18 (gray water tank level low, float switch 32 open, solenoid 18' energized), the gray water control valves 23A-D and 29 are shifted by fluid pressure in line 24 away from the rest position shown wherein gray water can flow from any of the sources 19A-D through such valves 23A-D and 29 to the tank 10. On the other hand, with gray water solenoid valve 18 in its rest position shown (solenoid 18' deenergized, as due to a fill condition of the tank 10 closing float switch 32, energizing relay CR1 and opening contact CR1'); solenoid 18 exhausts line 24 to the tank 10 permitting spring return of the valve members in valves 23A-D and 29 to their rest position shown wherein gray water from sources 19A-D is routed to the sewer line 26. In the event of failure of the electrical power source V or opening of switch 43 or MSS, electrical paths 41A-E are all deenergized. Therefore, regardless of the state of pressure switch 13, pump motor M is turned off and pump 11 is inoperative. Regardless of the water level in tank 10, solenoid 18 is deenergized and valve 18 is in its rest position shown, exhausting pressure from the line 24 such that gray water valves 23A–D and 29 must disconnect the gray water sources 19A–D from the tank 10, absolutely precluding any chance of overfilling thereof during this condition of the circuit. Again, regardless of the level in the tank 10, solenoid 37' is necessarily deenergized with valve 37 in its rest position shown, precluding the addition of fresh water to the tank 10 regardless of tank water level and thus preventing overfilling of the tank with fresh water with the circuit of FIG. 2 in its inoperative condition above specified.

Under normal operating conditions, failure of any or all of the valves 23A–D to return to the rest positions shown (wherein they block gray water flow from the corresponding source 19A–D to the tank 10) may not result in overflow of tank 10 since fail-safe valve 29 will normally block clean water flow through gray water drain line 27 where float switch 32 signals a tank full condition.

It is contemplated that given a change in polarity of the float switches 32, 38 that the relays and contacts CR1, CR1', CR2, CR2' may be eliminated and the float switches (reversed polarity) placed in series with their respective solenoids 18', 37'. This would mean opening of gray water float switch 32' (instead of closure) when tank level reaches maximum, and opening (rather than closing) of fresh water float switch 38 when tank water level is above the minimum range required to supply the pump 11. As a further modification, float actuated valves 23A–D and 29 may be replaced with electrically operated (e.g. solenoid) valves electrically energizable in place of relay CR1 by maximum tank water level sensing means such as a float switch 32 of proper polarity, thereby also eliminating the solenoid valve 18, its connection to line 14, and fluid lines 24 and 25.

Instead of the two path valves shown in FIG. 2 at 23A–23D, it is contemplated though less preferred that separate on-off valves may be used in the lines 21A–D and 22A–D, or merely in the gray water lines 22A–D so as to permit position blocking of flow into lines 22A–D and thence to the holding tank. Also contemplated for reducing initial system cost, though less preferred due to possible loss of some system operating reliability, is that valves 23A–D may be eliminated entirely and valve 29 relied on for preventing overfilling of tank 10.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A water reuse system applicable to a water use system of the type in which water drained from a point of use is normally discarded through a sewer line or the like to which the point of use drain connects, said water reuse system being arranged for supplying water drained from such point of use to a point of reuse, such water reuse system comprising in combination:

a holding tank for storing used water;

means responsive to a demand for water at said point of reuse for transferring water from said holding tank to said point of reuse;

means including a drain conduit for channeling water from said point of use drain alternatively to said drain conduit and to said sewer line, said drain conduit having an outlet connected with said holding tank and an inlet to which said point of use drain is additionally connectible;

valve means interposed in said drain conduit between point of use drain and holding tank, and being responsive to an excessive water level in said holding tank for blocking entry into said holding tank of water draining from said point of use, said valve means comprising a fail-safe valve of remote actuated type interposed in said drain conduit downstream of the point of use drains served by said holding tank, biasing means continuously urging said fail-safe valve to its closed position for blocking entry of used water into said holding tank from said point of use, externally powered valve operator means energized in response to a low water level in said holding tank for overcoming said biasing means and opening said fail-safe valve, said biasing means closing said valve upon failure of said valve operator or failure of external power to said valve operator means to prevent holding tank overflow.

2. The water reuse system of claim 1 in which said demand responsive means includes a demand water conduit connecting an outlet of said holding tank to said point of water reuse and including a pump for pressurizing said conduit and a pressure switch responsive to low pressure at the point of water reuse for actuating said pump, and means for electrically connecting said pump and pressure switch serially across a voltage source, said valve operator being fluid pressure responsive and including means responsive to said low water level for applying fluid pressure from said demand water conduit to said valve operator to open said fail-safe valve.

3. The water reuse system of claim 1 in which said holding tank is free of overflow pipes or the like and free of connection to said sewer line except as may be provided through a said demand responsive means and point of reuse, so as to protect said holding tank from contamination by sewage in the event of a backup of said sewer line.

4. A water reuse system applicable to a water use system of the type in which water drained from a point of use is normally discarded through a sewer line or the like to which the point of use drain connects, said water reuse system being arranged for supplying water drained from such point of use to a point of reuse, such water reuse system comprising in combination:

a holding tank for storing used water;

means responsive to a demand for water at said point of reuse for transferring water from said holding tank to said point of reuse;

means including a drain conduit for channeling water from said point of use drain alternatively to said drain conduit and to said sewer line, said drain conduit having an outlet connected with said holding tank and an inlet to which said point of use drain is additionally connectible;

valve means interposed in said drain conduit between point of use drain and holding tank, and being responsive to an excessive water level in said holding tank for blocking entry into said holding tank of water draining from said point of use, said valve means comprising several remote actuated valves for several point of use drains to be served by said drain conduit and holding tank, each said remote actuated valve being interposed between its corresponding point of use drain and the common drain conduit, a given said remote actuated valve including a valve member operable to disconnect said drain conduit from said point of use drain adjacent the sewer line connection of the latter.

5. The water reuse system of claim 4 in which said valves are two way valves each having ports respectively connectible to said drain conduit, said sewer line, and said point of use drain, said valve member being shiftable to a first position providing a flow path from said drain to said drain conduit while blocking a flow path from said point of use drain to said sewer line and a second position completing the flow path from said drain to said sewer line but blocking the flow path from said drain to said drain conduit.

6. The water reuse system of claim 4 in which said valve means includes a further valve interposed in said drain conduit downstream of said first mentioned valves, said further valve being actuable for positively blocking used water flow to said holding tank from said point of use drains regardless of the state of said first mentioned valves.

7. A water reuse system applicable to a water use system of the type in which water drained from a point of use is normally discarded through a sewer line or the like to which the point of use drain connects, said water reuse system being arranged for supplying water drained from such point of use to a point of reuse, such water reuse system comprising in combination:
a holding tank for storing used water;
means responsive to a demand for water at said point of reuse for transferring water from said holding tank to said point of reuse;
means including a drain conduit for channeling water from said point of use drain alternatively to said drain conduit and to said sewer line, said drain conduit having an outlet connected with said holding tank and an inlet to which said point of use drain is additionally connectible;
valve means interposed in said drain conduit between point of use drain and holding tank, and being responsive to an excessive water level in said holding tank for blocking entry into said holding tank of water draining from said point of use, said valve means comprising a water level sensing switch in said holding tank and a remote actuated valve of fluid actuated type, said demand responsive means comprising a pressurized water supply line leading from said holding tank to said point of reuse, said valve means further including an electrically controlled valve connected to and controlled by said sensing switch and a fluid pressure line connected to actuate said remote actuated valve and further connected to be pressurized from the pressurized output of said holding tank through said electrically controlled valve.

8. The water reuse system of claim 7 including a drain line from said electrically controlled valve to said holding tank, said electrically controlled valve having a first position connecting said pressurized water line with said remote actuated valve and said fluid pressure line and a second position connecting said remote actuated valve and said fluid pressure line to drain through said drain line to said holding tank means.

9. The water reuse system of claim 8 in which said remote actuated valve and said electrically operated valve are externally actuated automatically returning valves, the automatically returned condition of said electrically operated valve closing its pressurized water line connection to said remote actuated valve but opening its connection of said remote actuated valve through said drain line to said holding tank means, said automatically returned position of said remote actuated valve closing the connection of said point of use drain to said drain conduit leaving the point of use drain open to said sewer line.

10. The water reuse system of claim 7 including a fresh water supply line to said holding tank, means including or further level sensing switch operatively associated with said holding tank for responding to a drop in water in said holding tank to a preselected minimum level, said demand responsive means including a pump having its input connected to said holding tank adjacent but below said minimum level, and including a fresh water control valve responsive to said further level sensing switch at said minimum water level for opening said fresh water supply line to raise the level in said holding tank, said minimum level being less than said excessive level.

11. The water reuse system of claim 7 in which said fluid actuated valve is an on-off valve interposed in said drain conduit downstream from all point of use drains emptying thereinto.

12. The water reuse system of claim 7 including a said fluid actuated valve specific to a given point of use drain and fluid actuable to divert water from the point of use drain to said drain conduit but deactuable to permit point of use draining to said sewer line.

* * * * *